United States Patent
Shimoyama

Patent Number: 5,949,073
Date of Patent: Sep. 7, 1999

[54] PHOTO DETECTOR

[75] Inventor: Masaki Shimoyama, Kusatsu, Japan

[73] Assignee: Matsushita Electric Industrial Co., Ltd., Osaka, Japan

[21] Appl. No.: 08/834,979

[22] Filed: Apr. 7, 1997

[30] Foreign Application Priority Data

May 7, 1996 [JP] Japan .................................. 8-112489

[51] Int. Cl.⁶ .............................. G01J 1/00; H01L 31/232
[52] U.S. Cl. ................ 250/338.4; 250/239; 250/370.01; 250/214.1; 250/353; 257/432; 359/355
[58] Field of Search ............................. 250/338.1, 338.4, 250/353, 370.01, 372, 239, 226, 214.1, 214 AL; 359/335, 356, 359; 257/432, 433, 434

[56] References Cited

U.S. PATENT DOCUMENTS

| | | | |
|---|---|---|---|
| 4,695,719 | 9/1987 | Wilwerding | 250/239 |
| 4,800,278 | 1/1989 | Taniguti et al. | 250/353 |
| 4,827,118 | 5/1989 | Shibata et al. | 250/226 |
| 5,166,755 | 11/1992 | Gat | 250/226 |
| 5,235,178 | 8/1993 | Hegyi | 250/226 |
| 5,519,208 | 5/1996 | Esparza et al. | 250/226 |
| 5,567,941 | 10/1996 | Fujikawa et al. | 250/353 |
| 5,623,143 | 4/1997 | Takamatsu | 250/214.1 |
| 5,631,460 | 5/1997 | Gray et al. | 250/226 |
| 5,691,536 | 11/1997 | Shimoyama et al. | 250/239 |
| 5,726,441 | 3/1998 | Samukawa et al. | 250/214.1 |

FOREIGN PATENT DOCUMENTS

| | | |
|---|---|---|
| 52-42390 | 4/1977 | Japan . |
| 61-277903 | 12/1986 | Japan ..................................... 359/359 |
| 63-200733 | 12/1988 | Japan . |
| 6122461 | 5/1994 | Japan . |

Primary Examiner—Constantine Hannaher
Assistant Examiner—Darren M. Jiron
Attorney, Agent, or Firm—Lowe Hauptman Gopstein Gilman & Berner

[57] ABSTRACT

A photo semiconductor element is covered by a cap with an incident window permitting incident light to penetrate through a translucent member. The photo semiconductor element detects a quantity of incident light penetrating through the translucent member of the incident window. The translucent member of the incident window is made of a material capable of suppressing the transmitting light quantity of incident light components having wavelengths less than 700 nm and larger than 900 nm. A photoelectric current output of the photo semiconductor element is controlled by the incident light penetrating through the translucent member of the incident window. The photo semiconductor element operates in multiple ways as a thermosensing sensor and a photosensing sensor.

12 Claims, 8 Drawing Sheets

PHOTO DETECTOR

BACKGROUND OF THE INVENTION

1. Field of the Invention

This invention relates to a photo detector used for visible ray sensors or infrared ray sensors controlling operations of various apparatuses or measuring environmental data.

2. Prior Art

This kind of conventional photo detector is disclosed in Unexamined Japanese Patent Application No. 52-42390 published in 1977, or in Unexamined Japanese Patent Application No. 6-122461 published in 1994.

FIG. 14 shows a conventional photo detector. A pair of leads 101 are assembled with a ceramic case 102. An epoxy-group resin portion 103 is provided in the ceramic case 102. A predetermined amount of dye 104 is added to this epoxy-group resin portion 103. With this additive, the maximum value of the spectral sensitivity of a semiconductor light-receiving element 105 is shifted from 650 nm to 570 nm in wavelength as shown in FIG. 15. Wavelength 650 is closer to the maximum visible sensitivity. Thus, the visible sensitivity can be optimized.

According to another conventional photo detector, a plurality of plates (not shown) different in their light transmittance are prepared. Among these plural plates, an optimum plate is combined with a photo semiconductor element to compensate a dispersion caused in the spectral sensitivity characteristics of this photo sensitive element. Thus, the photoelectric current output of the photo detector can be stabilized.

According to still another photo detector, a photo semiconductor element detects an incident light quantity by using the entirety of its wavelength sensitive range.

On the other hand, another photo detector detects an incident light quantity by cutting some components of particular wavelengths.

For example, a solar-radiation sensor is used in an automotive air-conditioning system. To detect any change in the thermal energy derived from solar radiation, a semiconductor element used in this solar-radiation sensor has a wavelength sensitivity ranging from 400 nm to 1,200 nm as characterized by a spectral sensitivity shown in FIG. 12.

This solar-radiation sensor has an incident light window permitting light to enter through a glass. A visible ray cutting agent is used to cut some components of light having wavelengths in the range of 400 nm to 700 nm. By the adoption of this visible ray cutting agent, the solar-radiation sensor can detect a solar-radiation quantity corresponding to the light components having wavelengths in the range of 700 nm to 1,200 nm. An output signal of the solar-radiation sensor is sent to a controller of the automotive air-conditioning system that controls the temperature in a compartment of an automotive vehicle automatically.

Furthermore, a light sensor is used in an automatic lighting system. To detect any change of surrounding brightness, a semiconductor element used in this light sensor has a wavelength sensitivity ranging from 400 nm to 1,200 nm as characterized by a spectral sensitivity shown in FIG. 13. The light sensor detects a light quality corresponding to all the light components whose wavelengths are within the entire range of 400 nm to 1,200 nm. An output signal of the light sensor is sent to a controller of the automatic lighting system that turns on and off the lights of an automotive vehicle automatically in accordance with surrounding brightness (i.e., in response to daylight and dark).

In this manner, for automotive vehicles, two different sensors are used for both the air-conditioning system and the automatic lighting system.

Using the above-described solar-radiation sensor as a light sensor is not preferable, because the photo semiconductor element having the spectral sensitivity shown in FIG. 12 has a strong sensitivity to an infrared ray. As a recent advanced optical system, there is a plate number recognition system for optically reading a plate number of a vehicle passing nearby. This type of recognition system emits an infrared ray with a peak of 900 nm, for example. When a vehicle with the above sensor passes by this kind of recognition system in the dark, the sensor possibly reacts against the infrared ray and the vehicle lights will be suddenly turned off.

From the foregoing reasons, it was impossible to use a single solar-radiation sensor for both of the automotive air-conditioning system and the automatic lighting system.

Furthermore, changing the spectral sensitivity of a photosensor is not easy. This requirement possibly causes a change of wafer material or forces to change the manufacturing processes. In other words, manufactured parts will be special products rather than standard products. This will lead to an increase of costs.

SUMMARY OF THE INVENTION

In view of the foregoing, a principal object of the present invention is to provide a photo detector capable of operating as a solar-radiation sensor as well as a light sensor.

In order to accomplish the above-described and other related objects, the present invention disposes a light-transmittance adjusting member in front of a photo semiconductor element that detects a quantity of incident light penetrating through the light-transmittance adjusting member. This light-transmittance adjusting member is made of a material capable of limiting a light-transmittance quantity of specific light components having predetermined wavelengths. With this arrangement, the photo detector of the present invention can operate in multiple ways without changing the spectral sensitivity of the photo semiconductor element.

More specifically, a first aspect of the present invention provides a photo detector comprising a cap with an incident window permitting incident light to penetrate through a translucent member, and a photo semiconductor element covered by the cap and detecting a quantity of incident light penetrating through the translucent member of the incident window, wherein the translucent member of the incident window is capable of adjusting a transmitting light quantity of a specific component of the incident light in a predetermined wavelength region, and a photoelectric current output of the photo semiconductor element is controlled by the incident light penetrating through the translucent member of the incident window, so that the photo semiconductor element has a multifunction equivalent to a plurality of sensors.

Preferably, the translucent member of the incident window suppresses the transmitting light quantity of incident light components having wavelengths less than 700 nm (corresponding to visible ray region) and larger than 900 nm (corresponding to infrared ray region). And, the photo semiconductor element operates in multiple ways as a thermosensing sensor (such as a solar-radiation sensor for an automotive air-conditioning system) as well as a photosensing sensor (such as a light sensor for an automatic lighting system). Furthermore, a body of the cap and the translucent member of the incident window are integrally made of a resin.

A second aspect of the present invention provides a photo detector comprising a photo semiconductor element covered by a resin coat and detecting a quantity of incident light penetrating through the resin coat, wherein the resin coat is capable of adjusting a transmitting light quantity of a specific component of the incident light in a predetermined wavelength region, and a photoelectric current output of the photo semiconductor element is controlled by the incident light penetrating through the resin coat, so that the photo semiconductor element has a multifunction equivalent to a plurality of sensors.

A third aspect of the present invention provides a photo detector comprising a photo semiconductor element covered by a resin mold and detecting a quantity of incident light penetrating through the resin mold, wherein the resin mold is capable of adjusting a transmitting light quantity of a specific component of the incident light in a predetermined wavelength region, and a photoelectric current output of the photo semiconductor element is controlled by the incident light penetrating through the resin mold, so that the photo semiconductor element has a multifunction equivalent to a plurality of sensors.

A fourth aspect of the present invention provides a photo detector comprising a photo semiconductor element coated by a resin coat, and a cap having an incident window permitting incident light to penetrate through a translucent member, the cap covering the photo semiconductor element, so that the photo semiconductor element detects a quantity of incident light penetrating through the translucent member of the incident window and the resin coat, wherein the resin coat is capable of adjusting a transmitting light quantity of a specific component of the incident light in a predetermined wavelength region, and a photoelectric current output of the photo semiconductor element is controlled by the incident light penetrating through the resin coat, so that the photo semiconductor element has a multifunction equivalent to a plurality of sensors.

Preferably, the resin coat is constituted by a material capable of suppressing the transmitting light quantity of incident light components having wavelengths less than 700 nm and larger than 900 nm. And, the photo semiconductor element operates in multiple ways as a thermosensing sensor and a photosensing sensor.

A fifth aspect of the present invention provides a photo detector comprising a photo semiconductor element coated by a resin coat, and a resin case permitting incident light to penetrate, the resin case covering the photo semiconductor element, so that the photo semiconductor element detects a quantity of incident light penetrating through the resin case and the resin coat, wherein the resin coat is capable of adjusting a transmitting light quantity of a specific component of the incident light in a predetermined wavelength region, and a photoelectric current output of the photo semiconductor element is controlled by the incident light penetrating through the resin coat, so that the photo semiconductor element has a multifunction equivalent to a plurality of sensors.

Preferably, the resin coat is constituted by a material capable of suppressing the transmitting light quantity of incident light components having wavelengths less than 700 nm and larger than 900 nm. And, the photo semiconductor element operates in multiple ways as a thermosensing sensor and a photosensing sensor.

A sixth aspect of the present invention provides a photo detector comprising an incident window permitting incident light to penetrate through a plurality of translucent members, and a photo semiconductor element detecting a quantity of incident light penetrating through the plurality of translucent members, wherein at least one of the plurality of translucent members of the incident window is capable of adjusting a transmitting light quantity of a specific component of the incident light in a predetermined wavelength region, and a photoelectric current output of the photo semiconductor element is controlled by the incident light penetrating through the at least one of the plurality of translucent members of the incident window, so that the photo semiconductor element has a multifunction equivalent to a plurality of sensors.

Preferably, the one of the plurality of translucent members of the incident window suppresses the transmitting light quantity of incident light components having wavelengths less than 700 nm and larger than 900 nm. And, the photo semiconductor element operates in multiple ways as a thermosensing sensor and a photosensing sensor.

Moreover, a seventh aspect of the present invention provides a photo detector comprising a photo semiconductor element directly covered by a plurality of translucent members and detecting a quantity of incident light penetrating through the plurality of translucent members, wherein at least one of the plurality of translucent members is capable of adjusting a transmitting light quantity of a specific component of the incident light in a predetermined wavelength region, and a photoelectric current output of the photo semiconductor element is controlled by the incident light penetrating through the at least one of the plurality of translucent members, so that the photo semiconductor element has a multifunction equivalent to a plurality of sensors.

Preferably, the one of the plurality of translucent members suppresses the transmitting light quantity of incident light components having wavelengths less than 700 nm and larger than 900 nm. And, the photo semiconductor element operates in multiple ways as a thermosensing sensor and a photosensing sensor.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
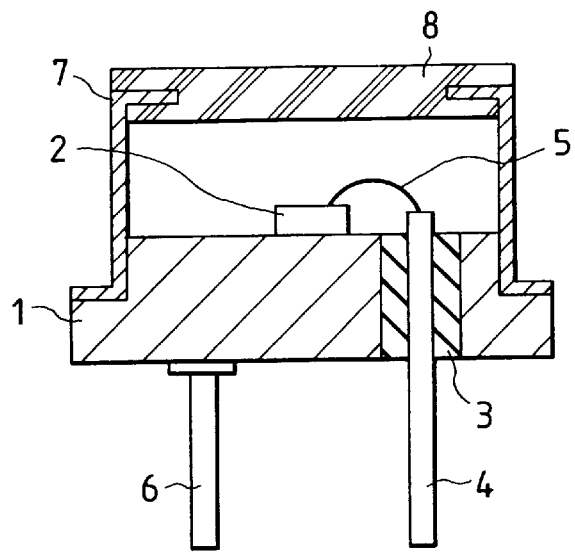
FIG. 1 is a vertical cross-sectional view showing an arrangement of a photo detector in accordance with a first embodiment of the present invention.

Preferred embodiments of the present invention will be explained with reference to the accompanying drawing. Identical parts are denoted by the same reference numerals throughout the drawing.

First Embodiment

In FIG. 1, reference numeral 1 represents a metallic base that is electrically conductive. A photo semiconductor element 2 is fixed at the central region on the upper surface of the metallic base 1. An electrically conductive adhesive or the like is used to bond the photo semiconductor element 2 on the upper surface of the metallic base 1. Glass 3 is filled in a through hole opened vertically across the metallic base 1. One lead 4 is inserted into the through hole of the metallic base 1 with a hermetic seal method. Thus, the lead 4 is held in an insulated condition. An upper end of lead 4 is connected to the photo semiconductor element 2 via a gold wire 5. Another lead 6 is connected to the bottom of metallic base 1 with a soldering or equivalent method. A metallic cap 7 is attached on the metallic base 1 along the periphery thereof. An opening is provided at the top (i.e., ceiling) of the metallic cap 7. This opening serves as an incident window. Translucent member 8 is provided so as to close the opening of the incident window. Thus, incident light penetrates through the translucent member 8 provided at the incident window and reaches the photo semiconductor element 2 fixedly placed on the upper surface of metallic base 1.

Figure 2:
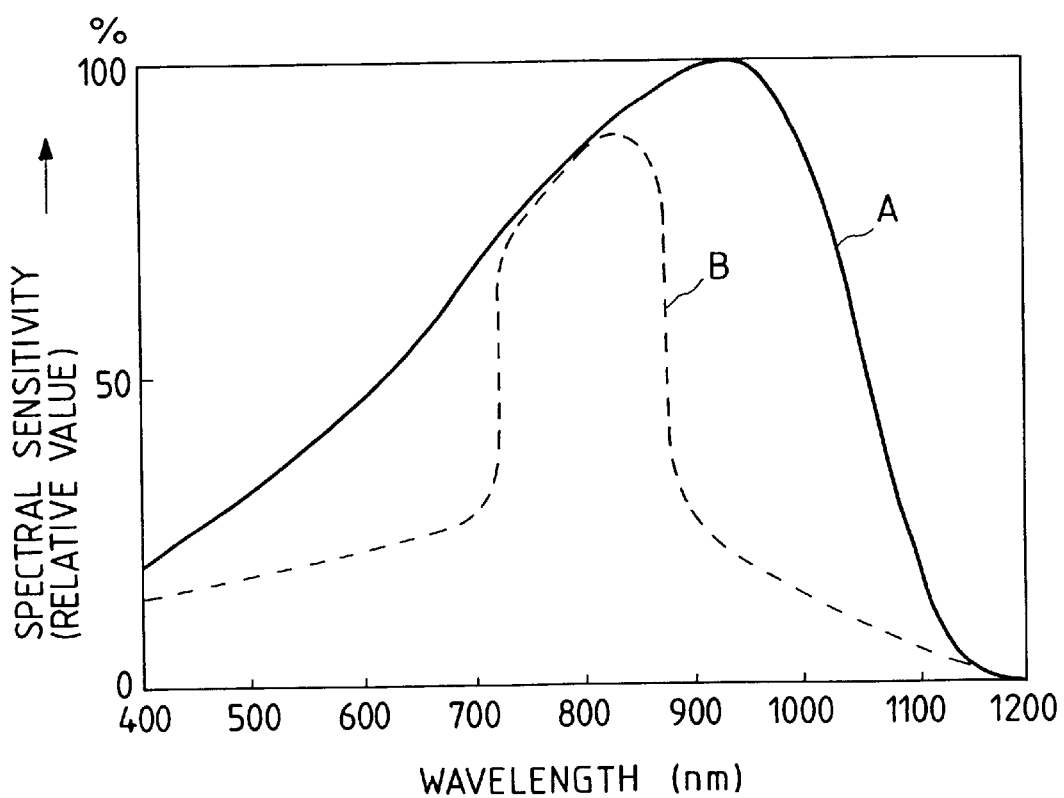
FIG. 2 is a graph illustrating the spectral sensitivity characteristics of a photo semiconductor element used in the photo detector in accordance with the first embodiment of the present invention.

The translucent member 8 is constituted by a glass material or a resin material containing a predetermined amount of additive. This additive is added to adjust the spectral transmittance of incident light entering into the photo semiconductor element 2. For example, the translucent member 8 is made of a phosphate glass. By adding 2 weight % iron component to this phosphate glass, the spectral sensitivity characteristics of the photo semiconductor element 2 can be changed from "curve A" to "curve B" as shown in FIG. 2. In FIG. 2, "curve A" represents the spectral sensitivity of a photo semiconductor element preferably used for solar-radiation sensors. Changing the spectral sensitivity characteristics of the photo semiconductor element 2 from "curve A" to "curve B" is meaningful in that the spectral sensitivity can be suppressed in a visible ray region from 400 to 700 nm as well as in an infrared ray region exceeding 900 nm.

The photo detector of the first embodiment combines the translucent member 8 with photo semiconductor element 2, so as to possess the controlled spectral sensitivity characteristics shown by "curve B". When this photo detector acts as a light sensor for an automatic lighting system, the photo semiconductor element 2 can sense the surrounding brightness in the wavelength region from 700 nm to 900 nm.

According to the photo detector of the first embodiment, due to the presence of translucent member 8, the spectral sensitivity of the photo semiconductor element 2 is intentionally suppressed in the wavelength region from 400 nm to 700 nm but is not completely cut away as was so in the prior art. This means that the photo semiconductor element 2 is sensible to the daylight even in the wavelength region from 400 nm to 700 nm as well as in the wavelength region from 700 nm to 900 nm.

The photo semiconductor element 2 generates a photoelectric current output proportional to the sensed light quality. Thus, in response to the photoelectric current output of the photo semiconductor element 2, the vehicle lights can be turned off automatically during the daylight time and turned on during the night time.

Furthermore, when the vehicle passes by a plate number recognition apparatus during the night time, the photo semiconductor element 2 may receive an artificial beam such as an infrared ray with a peak of 900 nm. However, according to the first embodiment of the present invention, the spectral sensitivity of the photo semiconductor element 2 is reduced to one tenth (i.e., 1/10) in the wavelength region exceeding 900 nm. Accordingly, the photo semiconductor element 2 is not sensible to this artificial beam. In other words, the vehicle lights can be held in a turned-on condition. This is effective for vehicle safety.

When the photo detector acts as a solar-radiation sensor, the spectral sensitivity characteristics of "curve B" has a sufficient magnitude for the photo semiconductor element 2 to detect thermal energy from the sun light.

Second Embodiment

Figure 3:
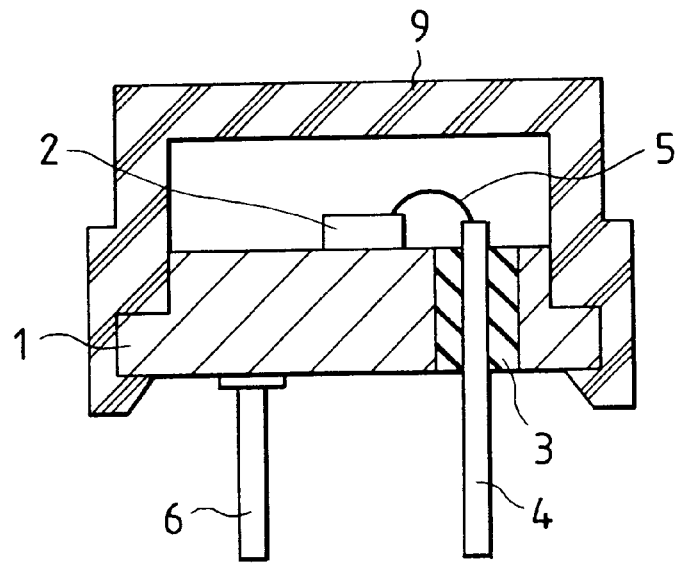
FIG. 3 is a vertical cross-sectional view showing an arrangement of a photo detector in accordance with a second embodiment of the present invention.

FIG. 3 shows an arrangement of a photo detector in accordance with a second embodiment of the present invention.

The arrangement shown in FIG. 3 is different from the arrangement shown in FIG. 1 in that the metallic cap 7 and the translucent member 8 are replaced by a single synthetic resin case 9. The synthetic resin case 9 is made of a material capable of adjusting the spectral transmittance of light entering into the photo semiconductor element 2 in the same manner as the first embodiment.

Figure 4:
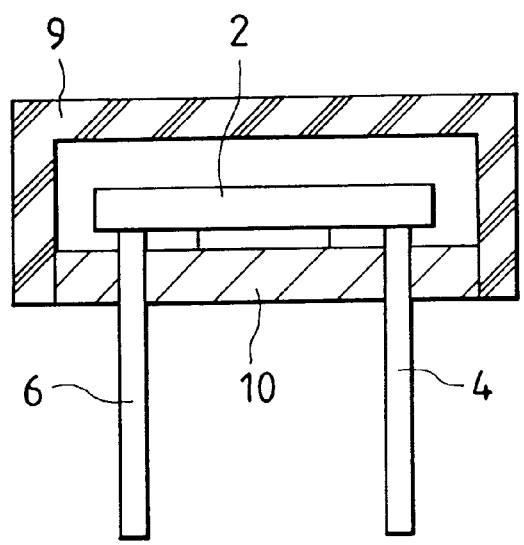
FIG. 4 is a vertical cross-sectional view showing another arrangement of the photo detector in accordance with the second embodiment of the present invention.

FIG. 4 shows another arrangement of a photo detector in accordance with the second embodiment of the present invention.

The arrangement shown in FIG. 4 is different from the arrangement shown in FIG. 3 in that the metallic base 1 is replaced by a sealing resin 10.

According to the second embodiment, the construction, fabrication and assembling of the photo detector can be simplified.

Third Embodiment

Figure 5:
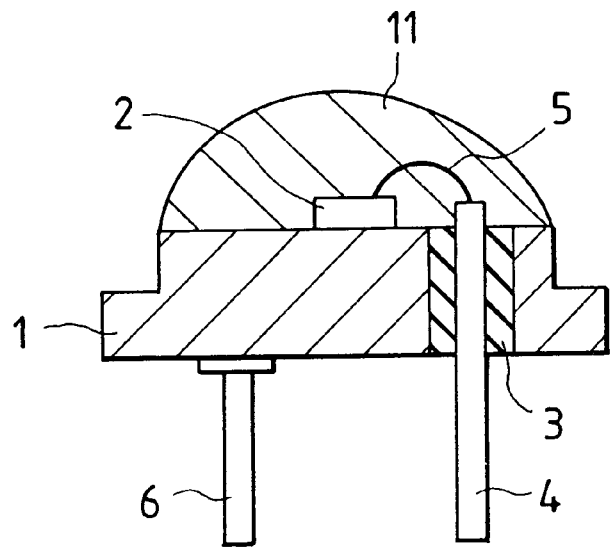
FIG. 5 is a vertical cross-sectional view showing an arrangement of a photo detector in accordance with a third embodiment of the present invention.

FIG. 5 shows an arrangement of a photo detector in accordance with a third embodiment of the present invention.

The arrangement shown in FIG. 5 is different from the arrangement shown in FIG. 1 in that the metallic cap 7 and the translucent member 8 are replaced by a resin coat 11. The photo semiconductor element 2 is directly enclosed by a synthetic resin. Thus, the photo semiconductor element 2 is directly covered by the resin coat 11. The resin coat 11 is made of a material capable of adjusting the spectral transmittance of light entering into the photo semiconductor element 2 in the same manner as the first embodiment.

Figure 6:
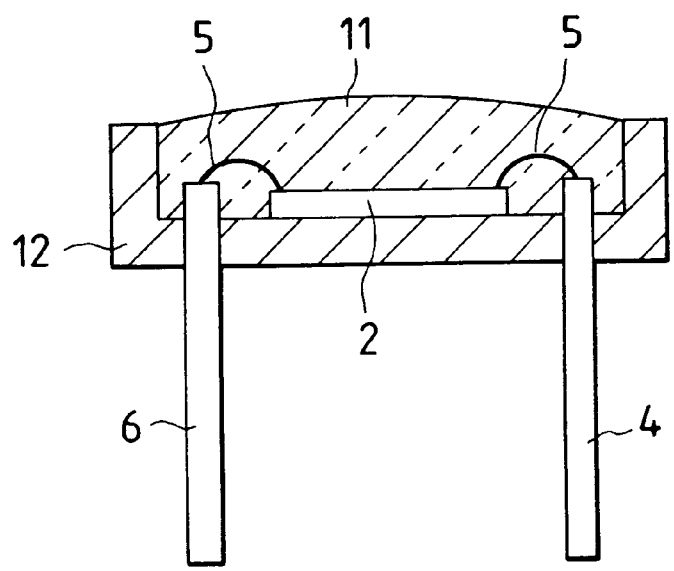
FIG. 6 is a vertical cross-sectional view showing another arrangement of the photo detector in accordance with the third embodiment of the present invention.

FIG. 6 shows another arrangement of a photo detector in accordance with the third embodiment of the present invention.

The arrangement shown in FIG. 6 is different from the arrangement shown in FIG. 5 in that the metallic base 1 is replaced by a sealing resin 12.

Fourth Embodiment

Figure 7:
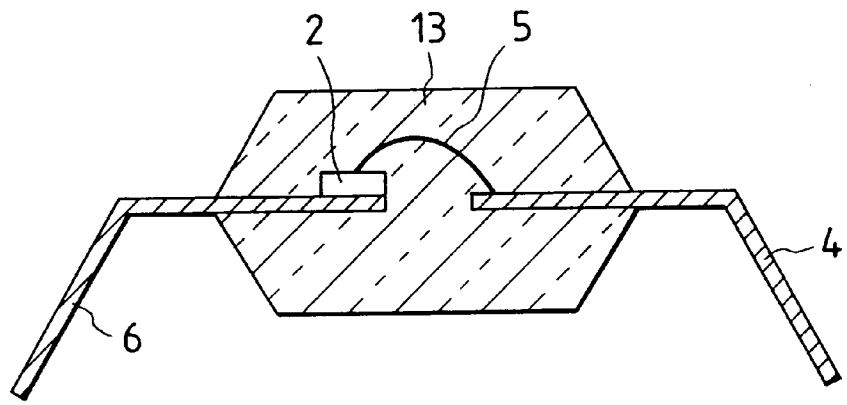
FIG. 7 is a vertical cross-sectional view showing an arrangement of a photo detector in accordance with a fourth embodiment of the present invention.

FIG. 7 shows an arrangement of a photo detector in accordance with a fourth embodiment of the present invention.

The arrangement shown in FIG. 7 is different from the arrangement shown in FIG. 1 in that the metallic cap 7, the translucent member 8 and the metallic base 1 are removed and the photo semiconductor element 2 is molded by a synthetic resin. Thus, the photo semiconductor element 2 is directly covered by a resin mold 13. The resin mold 13 is made of a material capable of adjusting the spectral transmittance of light entering into the photo semiconductor element 2 in the same manner as the first embodiment.

Fifth Embodiment

Figure 8:
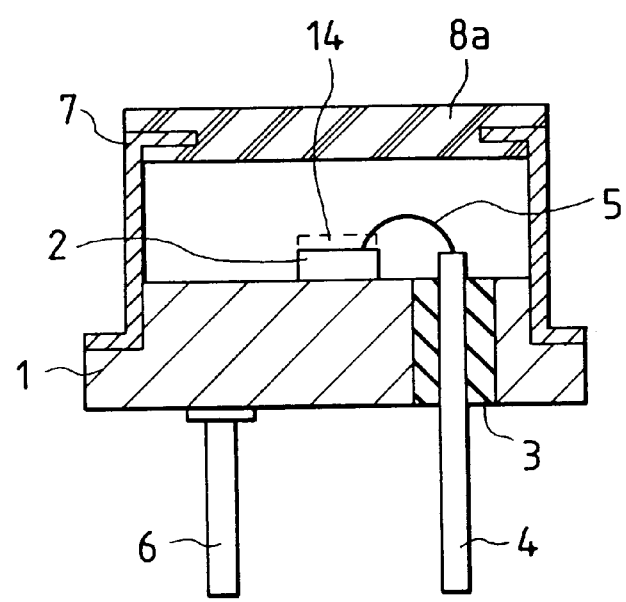
FIG. 8 is a vertical cross-sectional view showing an arrangement of a photo detector in accordance with a fifth embodiment of the present invention.

FIG. 8 shows an arrangement of a photo detector in accordance with a fifth embodiment of the present invention.

The arrangement shown in FIG. 8 is different from the arrangement shown in FIG. 1 in that the translucent member 8 is replaced by a simple translucent member 8a that has no function of adjusting the spectral sensitivity. Thus, all components of incident light penetrate the translucent member 8a thoroughly. Instead, a resin coat 14 is provided on the photo semiconductor element 2. Thus, the upper surface (light incident surface) of photo semiconductor element 2 is directly covered by the resin coat 14 of a synthetic resin. This resin coat 14 is made of a material capable of adjusting the spectral transmittance of light entering into the photo semiconductor element 2 in the same manner as the first embodiment.

Figure 9:
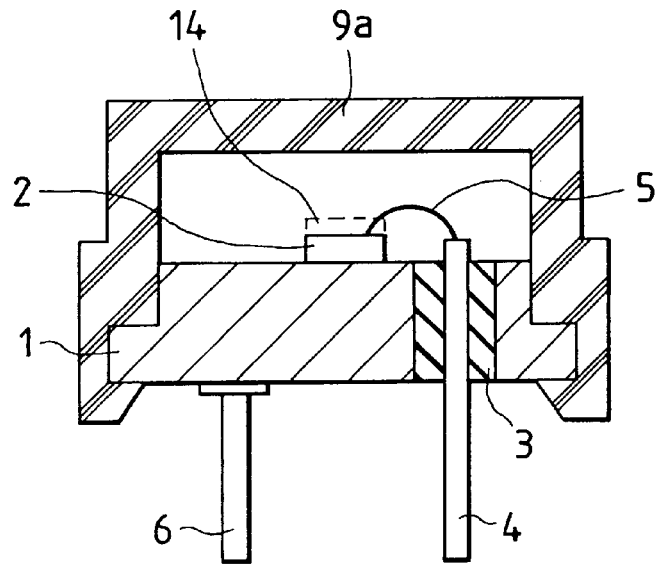
FIG. 9 is a vertical cross-sectional view showing another arrangement of the photo detector in accordance with the fifth embodiment of the present invention.

FIG. 9 shows another arrangement of a photo detector in accordance with the fifth embodiment of the present invention.

The arrangement shown in FIG. 9 is different from the arrangement shown in FIG. 8 in that the metallic cap 7 and the translucent member 8a are replaced by a synthetic resin case 9a that has no function of adjusting the spectral sensitivity. Thus, all components of incident light penetrate the synthetic resin case 9a thoroughly. Instead, the resin coat 14 is provided on the photo semiconductor element 2 in the same manner as the arrangement shown in FIG. 8. The upper surface (light incident surface) of photo semiconductor element 2 is thus directly covered by the resin coat 14. As described above, this resin coat 14 is made of a material capable of adjusting the spectral transmittance of light entering into the photo semiconductor element 2 in the same manner as the first embodiment.

Sixth Embodiment

Figure 10:
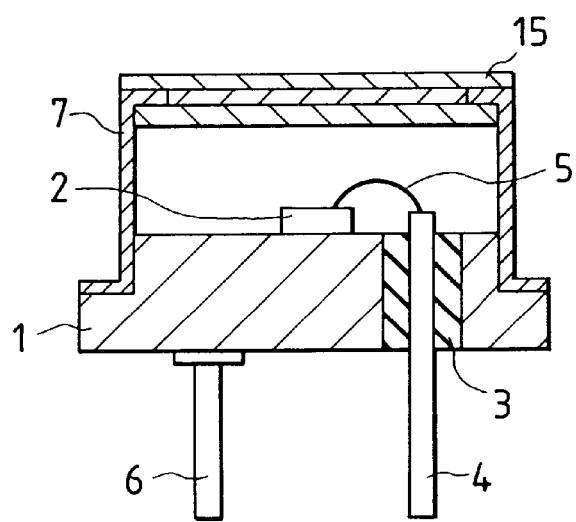
FIG. 10 is a vertical cross-sectional view showing an arrangement of a photo detector in accordance with a sixth embodiment of the present invention.

FIG. 10 shows an arrangement of a photo detector in accordance with a sixth embodiment of the present invention.

The arrangement shown in FIG. 10 is different from the arrangement shown in FIG. 1 in that the translucent member 8 is replaced by a multilayered translucent member 15 consisting of a plurality of stacked translucent layers, such as a glass layer, a resin layer and a coating layer. At least one of the plurality of translucent layers of the multilayered translucent member 15 is made of a material capable of adjusting the spectral transmittance of light entering into the photo semiconductor element 2 in the same manner as the first embodiment.

With this arrangement, the diffusibility of incident light can be improved, and the resultant spectral sensitivity becomes sharp. This brings an increase of the output width and an improvement of accuracy.

Seventh Embodiment

Figure 11:
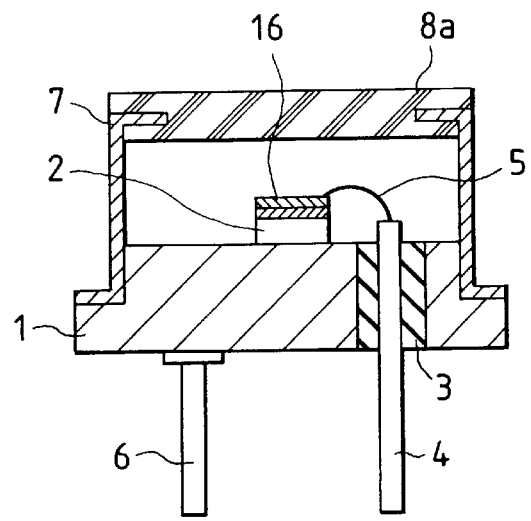
FIG. 11 is a vertical cross-sectional view showing an arrangement of a photo detector in accordance with a seventh embodiment of the present invention.
Figure 12:
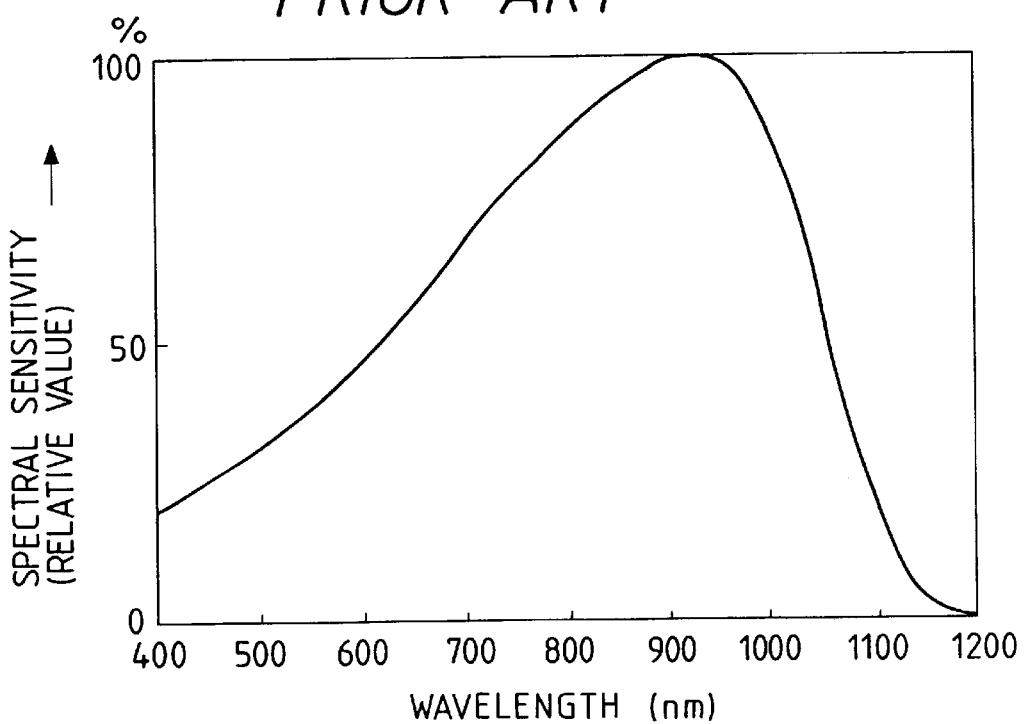
FIG. 12 is a graph illustrating the spectral sensitivity characteristics of a semiconductor element used in a conventional solar-radiation sensor for automotive vehicles.
Figure 13:
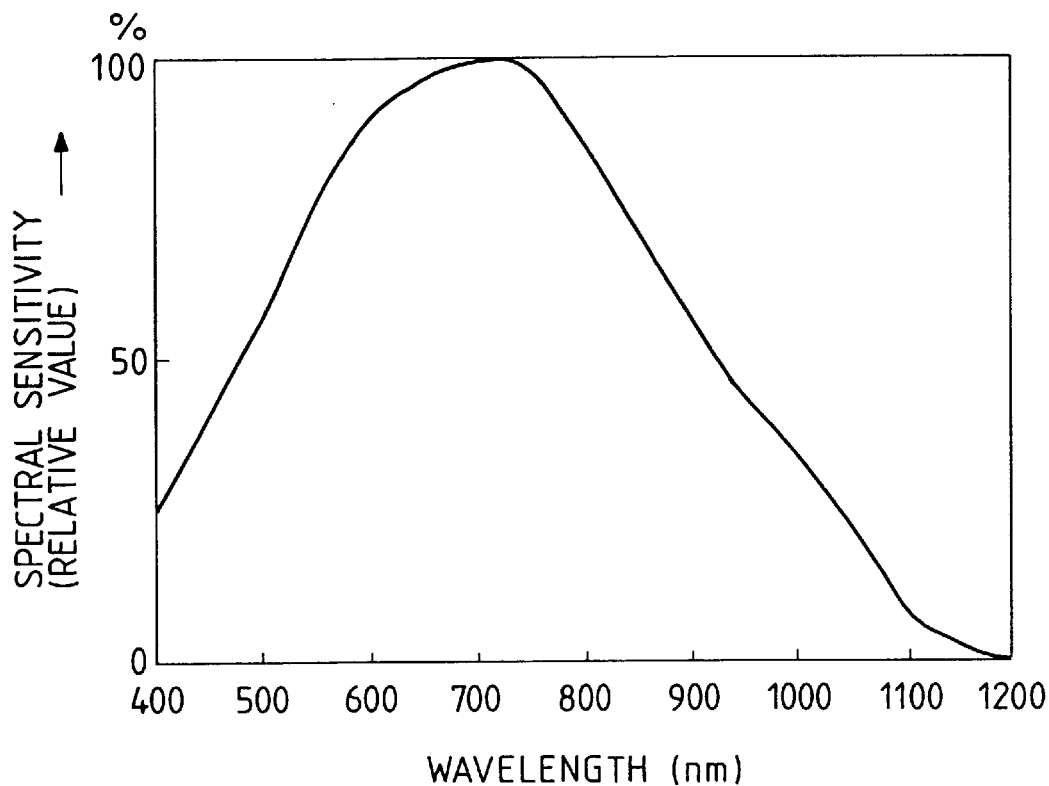
FIG. 13 is a graph illustrating the spectral sensitivity characteristics of a semiconductor element used in a conventional light sensor for automatic lighting systems of automotive vehicles.
Figure 14:
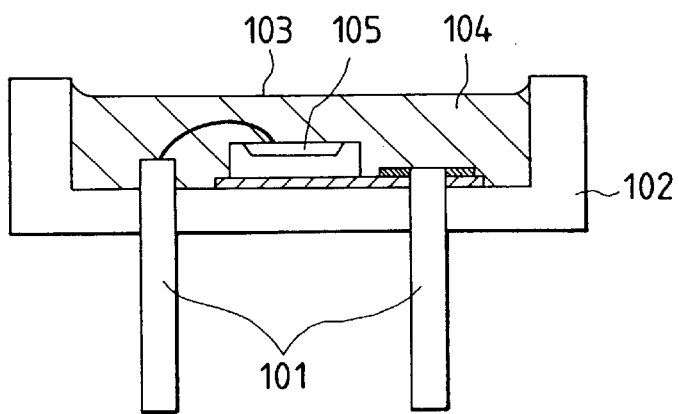
FIG. 14 is a vertical cross-sectional view showing an arrangement of a conventional photo detector.
Figure 15:
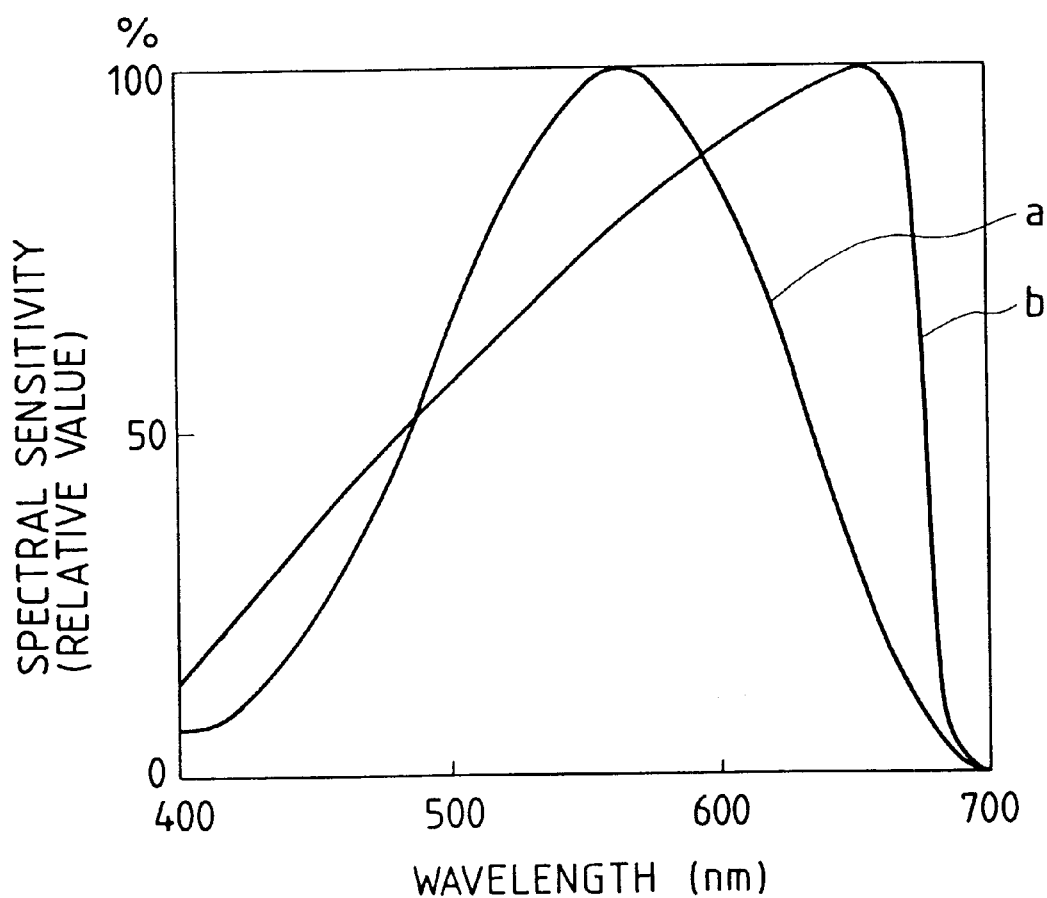
FIG. 15 is a graph illustrating the spectral sensitivity characteristics of a photo semiconductor element used in this conventional photo detector.

FIG. 11 shows an arrangement of a photo detector in accordance with a seventh embodiment of the present invention.

The arrangement shown in FIG. 11 is different from the arrangement shown in FIG. 8 in that the resin coat 14 is replaced by a multilayered translucent member 16 consisting of a plurality of stacked translucent layers, such as a resin layer and a coating layer. At least one of the plurality of translucent layers of the multilayered translucent member 16 is made of a material capable of adjusting the spectral transmittance of light entering into the photo semiconductor element 2 in the same manner as the first embodiment.

With this arrangement, the multilayered translucent member 16 is protected by cap 7 and the diffusibility of incident light can be improved, and the resultant spectral sensitivity becomes sharp. This brings an increase of the output width and an improvement of accuracy.

As described above, according to the present invention, a light-transmittance adjusting member is disposed in front of a photo semiconductor element that detects a quantity of incident light penetrating the light-transmittance adjusting member. This light-transmittance adjusting member is made of a material capable of limiting a light-transmission quantity of specific light components having predetermined wavelengths;. With this arrangement, the photo detector of the present invention can operate in multiple ways without changing the spectral sensitivity of the photo semiconductor element.

Preferably, the light-transmittance adjusting member of the incident window suppresses the transmitting light quantity of incident light components having wavelengths less than 700 nm (corresponding to visible ray region) and larger than 900 nm (corresponding to infrared ray region). Thus, the photo detector of the present invention can operate as a thermosensing sensor (such as a solar-radiation sensor for an automotive air-conditioning system) as well as a photosensing sensor (such as a light sensor for an automatic lighting system). Furthermore, a body of the cap and the translucent member of the incident window are integrally made of a resin. Or, the light incident surface of the photo semiconductor element can be directly covered by a resin coat or a resin mold.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A photo detector comprising:

a cap, a photo semiconductor element covered by said cap and having a predetermined spectral sensitivity characteristic, and an incident window in said cap, said incident window having a translucent member for modifying said predetermined spectral sensitivity characteristic of said photo semiconductor element, said incident window permitting incident light to penetrate through said translucent member, wherein said translucent member of said incident window partially suppresses a transmitting light quantity of only specific wavelength components of said incident light penetrating therethrough, so that a combined spectral sensitivity characteristic of a combination of said translucent member and said photo semiconductor element is modified by said translucent member from said predetermined spectral sensitivity characteristic of said photo semiconductor element;

wherein a photoelectric current output of said photo semiconductor element is controlled by the incident light penetrating through said translucent member of said incident window; and wherein said translucent member of said incident window partially suppresses the transmitting light quantity of incident light components having wavelengths less than 700 nm and larger than 900 nm.

2. A photo detector comprising:

a cap, a photo semiconductor element covered by said cap and having a predetermined spectral sensitivity characteristic, and an incident window in said cap, said incident window having a translucent member for modifying said predetermined spectral sensitivity characteristic of said photo semiconductor element, said incident window permitting incident light to penetrate through said translucent member, wherein said translucent member of said incident window partially suppresses a transmitting light quantity of only specific wavelength components of said incident light penetrating therethrough, so that a combined spectral sensitivity characteristic of a combination of said translucent member and said photo semiconductor element is modified by said translucent member from said predetermined spectral sensitivity characteristic of said photo semiconductor element, wherein a photoelectric current output of said photo semiconductor element is controlled by the incident light penetrating through said translucent member of said incident window; and wherein said photo semiconductor element has multiple applications using said combined spectral sensitivity characteristic as a thermosensing sensor and a photosensing sensor.

3. A photo detector comprising:

a photo semiconductor element coated by a resin coat and having a predetermined spectral sensitivity characteristic, and a cap having an incident window permitting incident light to penetrate through a translucent member, said cap covering said photo semiconductor element, so that said photo semiconductor element detects a quantity of incident light penetrating through said translucent member of said incident window and through said resin coat, wherein said resin coat partially suppresses a transmitting light quantity of only specific wavelength components of said incident light penetrating therethrough to modify said predetermined spectral sensitivity characteristic of said photo semiconductor element when combined with said resin coat, a photoelectric current output of said photo semiconductor element is controlled by the incident light penetrating through said resin coat; and said resin coat is constituted by a material partially suppressing the transmitting light quantity of incident light components having wavelengths less than 700 nm and larger than 900 nm.

4. A photo detector comprising:

a photo semiconductor element coated by a resin coat and having a predetermined spectral sensitivity characteristic, and a cap having an incident window permitting incident light to penetrate through a translucent member, said cap covering said photo semiconductor element, so that said photo semiconductor element detects a quantity of incident light penetrating through said translucent member of said incident window and through said resin coat, wherein said resin coat partially suppresses a transmitting light quantity of only specific wavelength components of said incident light penetrating therethrough to modify said predetermined spectral sensitivity characteristic of said photo semiconductor element when combined with said resin coat, a photoelectric current output of said photo semiconductor element is controlled by the incident light penetrating through said resin coat; and said photo semiconductor element has multiple applications using said modified spectral sensitivity characteristic as a thermosensing sensor and a photosensing sensor.

5. A photo detector comprising:

a photo semiconductor element coated by a resin coat and having a predetermined spectral sensitivity characteristic, and a resin case permitting incident light to penetrate, said resin case covering said photo semiconductor element, so that said photo semiconductor element detects a quantity of incident light penetrating through said resin case and through said resin coat, wherein said resin coat partially suppresses a transmitting light quantity of only specific wavelength components of said incident light penetrating therethrough to modify said predetermined spectral sensitivity characteristic of said photo semiconductor element when combined with said resin coat, a photoelectric current output of said photo semiconductor element is controlled by the incident light penetrating through said resin coat; and said resin coat is constituted by a material partially suppresses the transmitting light quantity of incident light components having wavelengths less than 700 nm and larger than 900 nm.

6. A photo detector comprising:

a photo semiconductor element coated by a resin coat and having a predetermined spectral sensitivity characteristic, and a resin case permitting incident light to penetrate, said resin case covering said photo semiconductor element, so that said photo semiconductor element detects a quantity of incident light penetrating through said resin case and through said resin coat, wherein said resin coat partially suppresses a transmitting light quantity of only specific wavelength components of said incident light penetrating therethrough to modify said predetermined spectral sensitivity characteristic of said photo semiconductor element when combined with said resin coat, a photoelectric current output of said photo semiconductor element is controlled by the incident light penetrating through said resin coat; and said photo semiconductor element has multiple applications using said modified spectral sensitive characteristic as a thermosensing sensor and a photosensing sensor.

7. A photo detector comprising:

an incident window permitting incident light to penetrate through a plurality of translucent members, and a photo semiconductor element having a predetermined spectral sensitivity characteristic, wherein at least one of said plurality of translucent members of said incident window partially suppresses a transmitting light quantity of only specific wavelength components of said incident light for modifying said predetermined spectral sensitivity characteristic of said photo semiconductor element, so that said photo semiconductor element has a modified spectral sensitivity characteristic when combined with said plurality of translucent members, a photoelectric current output of said photo semiconductor element is controlled by the incident light penetrating through said plurality of translucent members of said incident window; and said one of said plurality of translucent members of said incident window partially suppresses the transmitting light quantity of incident light components having wavelengths less than 700 nm and larger than 900 nm.

8. A photo detector comprising:

an incident window permitting incident light to penetrate through a plurality of translucent members, and a photo semiconductor element having a predetermined spectral sensitivity characteristic, wherein at least one of said plurality of translucent members of said incident window partially suppresses a transmitting light quantity of only specific wavelength components of said incident light for modifying said predetermined spectral sensitivity characteristic of said photo semiconductor element, so that said photo semiconductor element has a modified spectral sensitivity characteristic when combined with said plurality of translucent members, a photoelectric current output of said photo semiconductor element is controlled by the incident light penetrating through said plurality of translucent members of said incident window; and said photo semiconductor element has multiple applications using said modified spectral sensitivity characteristic as a thermosensing sensor and a photosensing sensor.

9. A photo detector comprising:

a photo semiconductor element directly covered by a plurality of translucent members and having a predetermined spectral sensitivity characteristic, wherein at least one of said plurality of translucent members partially suppresses a transmitting light quantity of only specific wavelength components of said incident light so that said photo semiconductor element has a modified spectral sensitivity characteristic when combined with said plurality of translucent members, a photoelectric current output of said photo semiconductor element is controlled by the incident light penetrating through said plurality of translucent members; and said one of said plurality of translucent members partially suppresses the transmitting light quantity of incident light components having wavelengths less than 700 nm and larger than 900 nm.

10. A photo detector comprising:

a photo semiconductor element directly covered by a plurality of translucent members and having a predetermined spectral sensitivity characteristic, wherein at least one of said plurality of translucent members partially suppresses a transmitting light quantity of only specific wavelength components of said incident light so that said photo semiconductor element has a modified spectral sensitivity characteristic when combined with said plurality of translucent members, a photoelectric current output of said photo semiconductor element is controlled by the incident light penetrating through said plurality of translucent members and said photo semiconductor element has multiple applications using said modified spectral sensitivity characteristic as a thermosensing sensor and a photosensing sensor.

11. A photo detector comprising:

a photo semiconductor element covered by a light-transmittance adjusting member and having a predetermined spectral sensitivity characteristic, wherein said light-transmittance adjusting member partially suppresses a transmitting light quantity of only specific wavelength components of said incident light for modifying said predetermined spectral sensitivity characteristic so that said photo semiconductor element has a modified spectral sensitivity characteristic when combined with said light-transmittance adjusting member;

a photoelectric current output of said photo semiconductor element is controlled by the incident light penetrating through said light-transmittance adjusting member; and said light-transmittance adjusting member partially suppresses the transmitting light quantity of incident light components having wavelengths less than 700 nm and larger than 900 nm.

12. A photo detector comprising:

a photo semiconductor element covered by a light-transmittance adjusting member and having a predetermined spectral sensitivity characteristic, wherein said light-transmittance adjusting member partially suppresses a transmitting light quantity of only specific wavelength components of said incident light for modifying said predetermined spectral sensitivity characteristic so that said photo semiconductor element has a modified spectral sensitivity characteristic when combined with said light-transmittance adjusting member;

a photoelectric current output of said photo semiconductor element is controlled by the incident light penetrating through said light-transmittance adjusting member; and said photo semiconductor element has multiple applications using said modified spectral sensitivity characteristic as a thermosensing sensor and a photosensing sensor.

* * * * *